United States Patent
Eckert et al.

(10) Patent No.: US 8,205,507 B2
(45) Date of Patent: Jun. 26, 2012

(54) ULTRASONIC SENSOR FOR MEASURING FLOW RATES IN LIQUID MELTS

(75) Inventors: Sven Eckert, Dresden (DE); Gunter Gerbeth, Dresden (DE); Thomas Gundrum, Ullersdorf (DE)

(73) Assignee: Forschungszentrum Dresden-Rossendorf E.V., Dresden (DE)

( * ) Notice: Subject to any disclaimer, the term of this patent is extended or adjusted under 35 U.S.C. 154(b) by 220 days.

(21) Appl. No.: 12/664,280

(22) PCT Filed: Jun. 10, 2008

(86) PCT No.: PCT/EP2008/057218
§ 371 (c)(1),
(2), (4) Date: May 18, 2010

(87) PCT Pub. No.: WO2008/152031
PCT Pub. Date: Dec. 18, 2008

(65) Prior Publication Data
US 2010/0218608 A1    Sep. 2, 2010

(30) Foreign Application Priority Data
Jun. 11, 2007 (DE) .......................... 10 2007 027 391

(51) Int. Cl.
*G01F 1/66* (2006.01)
(52) U.S. Cl. .................................................. 73/861.26
(58) Field of Classification Search ... 73/861.26–861.28
See application file for complete search history.

(56) References Cited

U.S. PATENT DOCUMENTS

| | | | | |
|---|---|---|---|---|
| 4,213,337 A * | 7/1980 | Langdon | ..................... | 73/290 V |
| 4,287,755 A | 9/1981 | Mansfield | | |
| 4,662,215 A | 5/1987 | Eckert | | |
| 4,770,699 A * | 9/1988 | Mountford | ..................... | 75/583 |
| 4,839,590 A * | 6/1989 | Koski et al. | ............. | 324/207.21 |
| 4,914,959 A | 4/1990 | Mylvaganam et al. | | |
| 5,708,209 A | 1/1998 | Stiffler et al. | | |
| 6,272,922 B1 | 8/2001 | Stevens et al. | | |
| 7,017,412 B2 * | 3/2006 | Thomas et al. | ................. | 73/579 |
| 7,194,907 B2 * | 3/2007 | Abbate et al. | ................... | 73/597 |
| 7,794,663 B2 * | 9/2010 | Pingree, Jr. et al. | ............ | 422/98 |
| 2006/0260929 A1 | 11/2006 | Hirabayashi et al. | | |

FOREIGN PATENT DOCUMENTS

| | | |
|---|---|---|
| DE | 19934876 A1 | 2/2000 |
| DE | 10055956 A1 | 5/2002 |
| DE | 10153297 A1 | 4/2003 |
| EP | 1293960 A2 | 3/2003 |

* cited by examiner

*Primary Examiner* — Jewel V Thompson
(74) *Attorney, Agent, or Firm* — Laurence A. Greenberg; Werner H. Stemer; Ralph E. Locher

(57) ABSTRACT

The invention relates to an ultrasonic sensor for measuring flow rates in liquid melts at high temperatures. The aim of the invention is to provide an ultrasonic sensor for carrying out local, continuous, reliable rate measurements in hot melts. To achieve this, the ultrasonic sensor contains an ultrasonic waveguide that is connected to the piezoelectric transducer and consists of a material with low acoustic damping properties in a temperature range relevant for the area of application of above 200 DEG C, said material being chemically resistant to the melt. In addition, the end face of the ultrasonic waveguide facing the melt is closed and can be wetted by the melt.

22 Claims, 2 Drawing Sheets

ULTRASONIC SENSOR FOR MEASURING FLOW RATES IN LIQUID MELTS

BACKGROUND OF THE INVENTION

Field of the Invention

The invention relates to an ultrasonic sensor for measuring local flow rates in liquid melts at high temperatures, said sensor consisting of a low-dispersion ultrasonic waveguide, a piezoelectric transducer and an electrical signal matching circuit.

In contrast to the optical measuring methods which are widespread in fluid mechanics, ultrasonic measuring methods are, in principle, also suitable for use in non-transparent fluids. The fundamental component of the measuring apparatus is the ultrasonic transducer in the form of a piezoelectric oscillator (also called piezoelectric crystal or piezoelectric transducer) which is electrically connected to a frequency generator and an evaluation device. The ultrasonic transducer transmits the ultrasonic waves into the fluid to be examined directly or via the outer wall of the container surrounding the fluid.

Ultrasonic flowmeters for determining the flow rate of flowing media in tubes or channels are widespread. DE 198 12 458 C2 describes a transmitting and/or receiving head for an ultrasonic flowmeter which is based on the propagation time method and is distinguished by the use of an ultrasonic waveguide with a high heat conduction resistance. The use of an ultrasonic waveguide to transmit ultrasonic signals makes it possible to spatially separate the hot melt and the piezoelectric transducer. The use of materials with a high heat conduction resistance to construct the ultrasonic waveguide is suitable for limiting the temperature at the piezoelectric transducer with a practical length of the ultrasonic waveguide.

In addition to the methods for measuring the flow rate by means of ultrasound, the ultrasonic Doppler method was also developed for the purpose of measuring rate profiles in technical flows (Y. Takeda: *Development of an ultrasound velocity profile monitor*. Nucl. Eng. Design, Vol. 126, 1991, 277-284). In the case of the ultrasonic Doppler method, ultrasonic measurement signals at a predefined frequency are injected into the flow. The smallest particles in the medium reflect the ultrasonic measurement signals, and the flow rate can be determined using the frequency shift of the ultrasonic measurement signals which are injected and output.

The use of an ultrasonic sensor with an integrated ultrasonic waveguide in the ultrasonic Doppler method requires dispersion-free transmission of the ultrasonic waves in the ultrasonic waveguide. Special requirements are therefore imposed on the structure of the ultrasonic waveguide. The material thickness of the structure carrying the ultrasonic waves must therefore be less than the minimum wavelength of the ultrasonic signal to be transmitted, transversely with respect to the transmission direction. The term "low-dispersion ultrasonic waveguide" is always used below for such ultrasonic waveguides. Various concepts for designing corresponding ultrasonic waveguides are known.

WO 96/41 157 proposes the use of a bundle of thin rods which are parallel to one another or a concentric arrangement of tubes with correspondingly graduated diameters in order to achieve dispersion-free signal transmission.

DE 100 21 187 C1 describes the structure of an ultrasonic waveguide made of a film which has been rolled up and the layer thickness of which is selected to be less than the shortest wavelength of the ultrasound in the ultrasonic waveguide material. This achieves largely interference-free propagation of the ultrasonic signal in the ultrasonic waveguide.

DE 100 53 508 A1 describes the practice of closing the end of an ultrasonic waveguide, which is wound from a film, using suitable disks in order to achieve better coupling with high energy transmission.

The previously proposed technical solutions thus satisfy the two following criteria:

An ultrasonic waveguide of finite length and made of a material with sufficiently low thermal conductivity prevents overheating of the piezoelectric transducer which is arranged on the side facing away from the measuring environment.

A structure of the ultrasonic waveguide made of sufficiently thin structures minimizes transmission losses caused by scattering and dispersion of the ultrasound in the ultrasonic waveguide.

BRIEF SUMMARY OF THE INVENTION

The invention is based on the object of developing an ultrasonic sensor for carrying out local continuous and reliable rate measurements in hot melts (T>200° C.)

The object is achieved, according to the invention, by means of an ultrasonic sensor for measuring local flow rates in liquid melts, said sensor consisting of a low-dispersion ultrasonic waveguide, in which the material thickness of the structure carrying the ultrasonic wave is less than the minimum wavelength of the ultrasonic signal to be transmitted, transversely with respect to the transmission direction, a piezoelectric transducer and an electrical signal matching circuit, the low-dispersion ultrasonic waveguide which is connected to the piezoelectric transducer being composed of a material which has low acoustic attenuation with an acoustic attenuation coefficient of $\alpha<10$ dB/m in a temperature range above 200° C., which is relevant to the application, and is chemically resistant to the melt, and that end face of the low-dispersion ultrasonic waveguide which faces the melt being closed and being able to be wetted by the melt.

The low-dispersion ultrasonic waveguide may be composed of the metals iridium, molybdenum, niobium, tantalum, tungsten, zirconium, stainless steel, titanium, Monel or an alloy or combination of said metals.

In one development of the invention, the ultrasonic waveguide consists of a multiplicity of films which are layered on top of one another in a two-dimensional manner, the propagation direction of the ultrasound being perpendicular to the surface normal. The low-dispersion ultrasonic waveguide preferably consists of metal films which are layered on top of one another.

Alternatively, the low-dispersion ultrasonic waveguide may be composed of a material combination of metals and ceramic and/or a glass material.

The length of the low-dispersion ultrasonic waveguide is between 100 mm and 1000 mm.

In a continuation of the invention, the protective sheath is chemically resistant to the melt and can additionally be provided with thermal insulation.

Furthermore, an intermediate space may be provided between the low-dispersion ultrasonic waveguide and the protective sheath, or the protective sheath may be of double-walled design and a coolant can flow through said protective sheath.

In another refinement of the invention, that part of the ultrasonic sensor which faces away from the melt and has the piezoelectric transducer and electrical components is surrounded by a protective housing. The protective housing is advantageously of double-walled design, and a coolant can flow through the intermediate space.

For good injection of the ultrasonic energy into the melt, that end face of the low-dispersion ultrasonic waveguide which faces the melt is mechanically and/or chemically freed of dirt and oxides and can additionally be provided with a smooth protective layer.

Additionally or alternatively, an additional smooth cover plate or film may be fitted to the end of the low-dispersion ultrasonic waveguide, the low-dispersion ultrasonic waveguide and the cover plate or the film being able to be composed of different materials.

Finally, the cover plate is provided with a thin smooth material layer which is applied by means of ion implantation or electrochemical or physical methods.

Another refinement of the invention is characterized in that the low-dispersion ultrasonic waveguide and the piezoelectric transducer are arranged immediately behind one another and are connected to one another by means of adhesive bonding, soldering or pressing. Furthermore, the piezoelectric transducer is connected to an evaluation device outside the ultrasonic sensor by means of capacitors and/or coils.

Symmetrically twisted conductors are provided for electrical signal transmission between the piezoelectric transducer and the evaluation device, and DC isolation is fitted between the piezoelectric transducer and the evaluation device.

A current-compensated inductor is fitted between the melt and the evaluation device in order to reduce the leakage current.

The invention is described in more detail below in an exemplary embodiment. In the associated drawings

DESCRIPTION OF THE INVENTION

Figure 1:
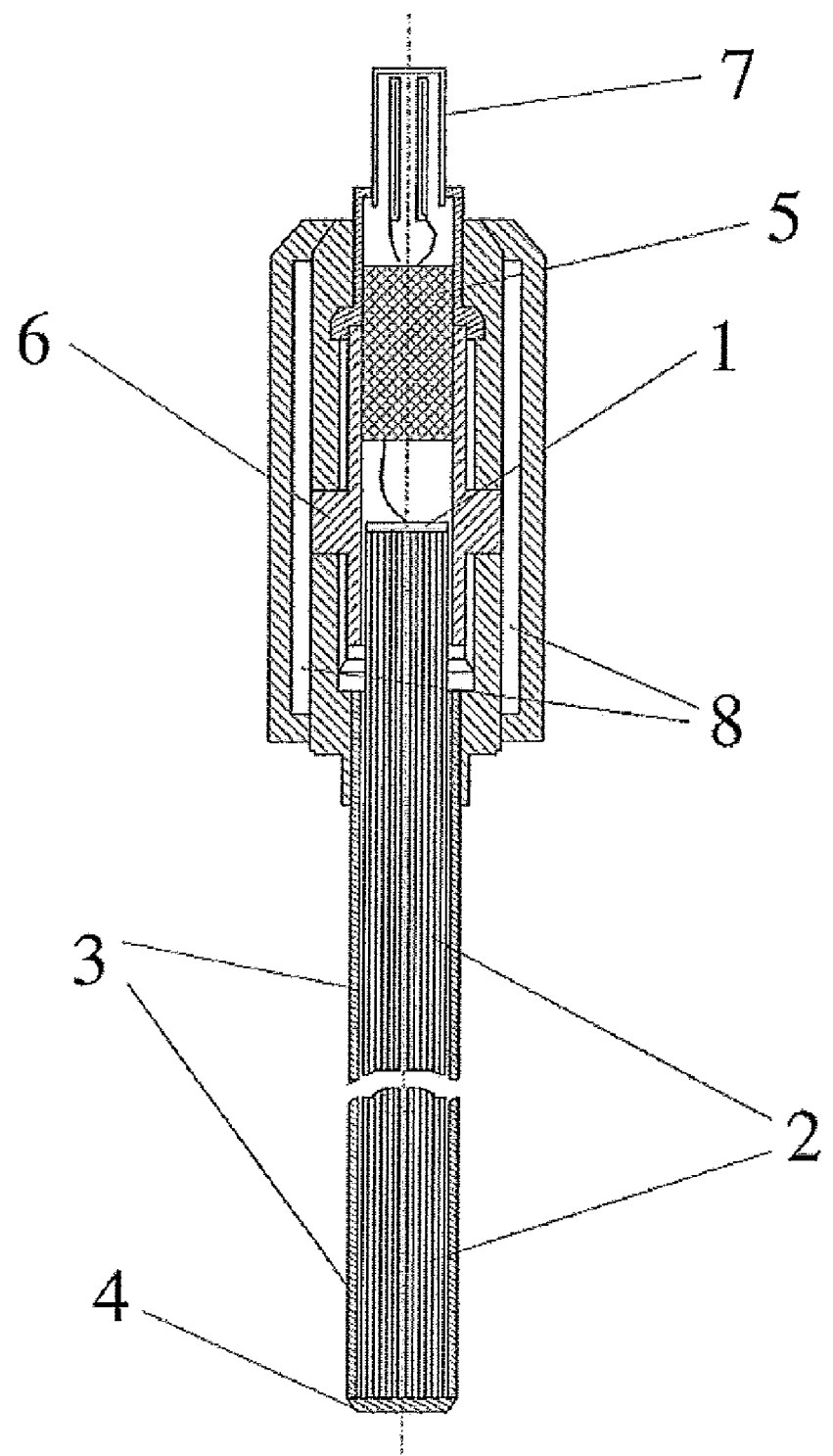
FIG. 1: shows a diagrammatic view of the ultrasonic sensor.

FIG. 1 illustrates the basic structure of an ultrasonic sensor according to the invention which operates according to the ultrasonic Doppler method. This ensures that only one sensor is needed to determine the rate of the flowing melt. The sensor must be immersed in a melt at an angle which is different from 90°. It is possible to use two or more ultrasonic sensors.

The ultrasonic sensor according to the invention consists of the main subassemblies of a piezoelectric transducer 1 with associated electronic components 5 for controlling the transducer 1 and for internally conditioning, matching and evaluating the signals and a coupled low-dispersion ultrasonic waveguide 2 in an axial arrangement. In this case, the piezoelectric transducer 1 is on that side of the ultrasonic waveguide 2 which faces away from the flow. The low-dispersion ultrasonic waveguide 2 is surrounded by a protective sheath 3.

The output signal is applied to a connection socket 7, which is axially downstream of the electronic components 5, and can therefore be transmitted to an evaluation device (not illustrated) outside the sensor via a cable.

The piezoelectric transducer 1 and the electrical signal matching components 5 are accommodated in a protective housing 6.

All of the sensor components inside the protective housing 6 must be permanently kept at a temperature level of less than 100° C. With a corresponding thermal load, the protective housing 6 may be of double-walled design, the intermediate space 8 of the protective housing 6 being able to be connected to a coolant reservoir via corresponding connections, and a coolant being able to flow through said intermediate space during measurement.

Figure 2:
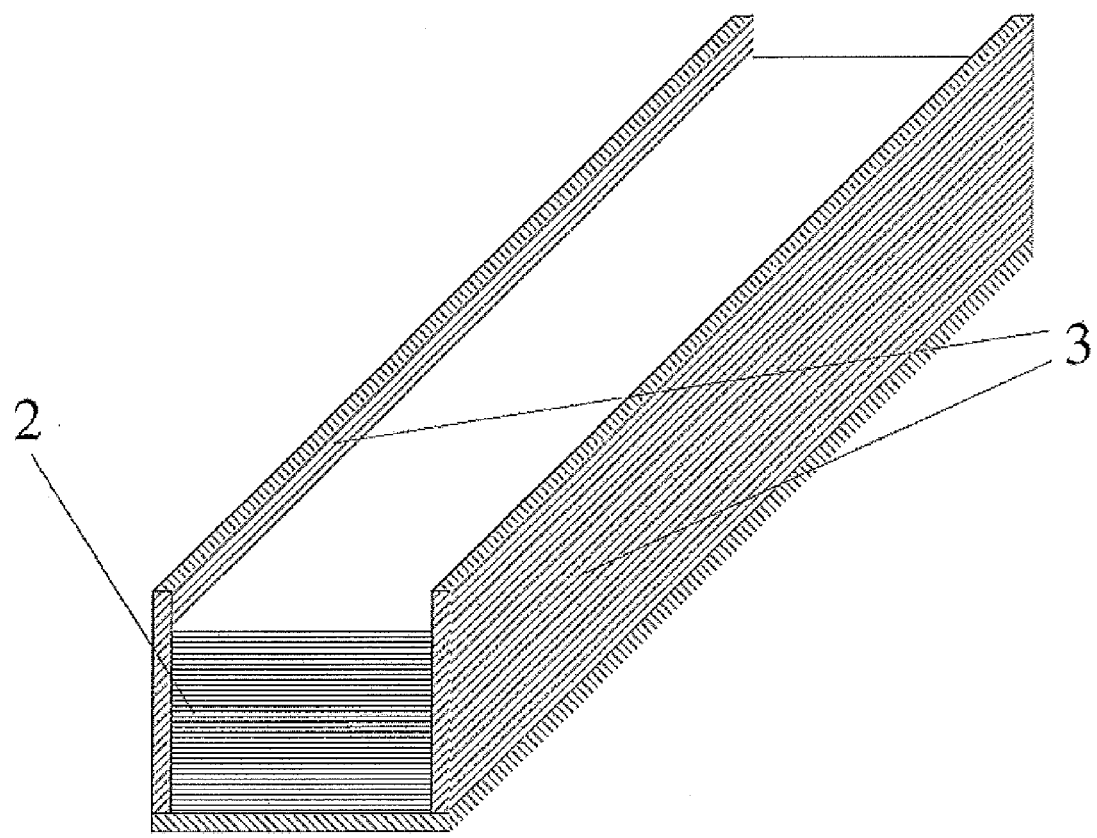
FIG. 2: shows a special design of a low-dispersion ultrasonic waveguide consisting of a multiplicity of individual films which are layered on top of one another.

A special configuration of the low-dispersion ultrasonic waveguide 2 consisting of a multiplicity of metal films which are layered on top of one another in a two-dimensional manner can be seen in FIG. 2. The propagation direction of the ultrasound runs perpendicular to the surface normal of the individual films. The individual film layers each have, for example, a size of 5×300 mm$^2$ with a thickness of 75 μm.

The low-dispersion ultrasonic waveguide 2 is provided with a protective sheath 3 whose shape is matched to the cross section of the ultrasonic waveguide 2. In order to ensure the function of the ultrasonic waveguide 2, that end of the protective sheath 3 of the ultrasonic waveguide 2 which faces the melt may be closed with a cover plate 4 (FIG. 1).

There is a homogeneous material connection between the cover plate 4 and the film layers of the low-dispersion ultrasonic waveguide 2. There is no need for the ultrasonic waveguide 2, the protective sheath 3 and the cover plate 4 to be composed of the same material.

For use in a tin melt at approximately 1000° C., the low-dispersion ultrasonic waveguide 2 may be produced, for example, from a molybdenum film in a stainless steel tube which is closed with a stainless steel cover plate 4 at the front end. In order to produce wetting, which is sufficient for a good acoustic transition, between the ultrasonic sensor and the tin melt, the surface of the stainless steel cover plate 4 is mechanically polished and then treated with phosphoric acid. Tin is then electrolytically deposited on the cleaned surface.

The field of use of a piezoelectric transducer is limited by its Curie temperature. If this temperature threshold is exceeded, the transducer material loses its piezoelectric properties. The melting temperature of a multiplicity of commercially interesting metals, semiconductors or glasses is considerably above the Curie temperature of customary piezoceramics.

Use of the ultrasonic Doppler method in these melts requires a technical solution which establishes stable, acoustic contact between the ultrasonic transducer 2 and the fluid and simultaneously protects the piezoelectric transducer from the affect of the melt to be examined.

Transmission of radio-frequency ultrasonic signals with as little loss as possible is required to an even greater extent in the ultrasonic Doppler method than in the ultrasonic flow measurement methods in order to obtain usable measurement data. As a result of the high temperatures of the melts to be examined, a low-dispersion ultrasonic waveguide is integrated in the measuring concept. However, this is associated with transmission losses which cannot be avoided.

Additional losses arise during the ultrasonic testing of vessel walls, the structure of the wall material of containers for storing hot melts often being distinguished, in particular, by extremely poor ultrasound transmission properties. This results in the need to directly couple the sensor to the flow to be measured directly in the melt. The high application temperatures as well as the direct contact with the melt via the low-dispersion ultrasonic waveguide impose particular requirements on the design of the sensor, in particular on the physical properties of the ultrasonic waveguide material and its chemical stability or solubility in the melt.

It is known that any propagation of sound is accompanied by losses since some of the mechanical energy of the continuous sound wave is continuously converted into heat. This process is referred to as sound absorption and is characterized by the absorption coefficient α which describes an exponential decrease in the sound pressure p of a flat harmonic sound wave along a path x (H. Kuttruff: *Physik and Technik des Ultraschalls*. Hirzel Verlag Stuttgart, 1988, 191 ff.):

$$p(x)=p_0 e^{-\alpha x}$$

The absorption coefficient α depends on the transmission material and the frequency of the ultrasonic wave and is determined by the contributions of different loss mechanisms which stem from the interaction between the propagating wave and the atomic structure of the transmission medium. Parts of the absorption coefficient which can be attributed to sound absorption caused by crystal structure defects, scattering at thermal phonons or similar processes increase as the temperature increases. An increase in the temperature above values of 400° C., for example, already entails a measurable increase in the acoustic attenuation for many materials.

At temperatures above 700° C., it is possible to observe such a drastic increase in the transmission losses that meaningful use of the relevant material as an ultrasonic waveguide can be precluded. Only a small number of ultrasonic waveguide materials which can be carefully selected are therefore suitable for these special applications. The suitability of different materials with regard to their acoustic attenuation behavior at high temperatures was checked in comprehensive series of tests.

It has been found that iridium, molybdenum, niobium, tantalum, tungsten, zirconium, stainless steel, titanium, Monel or alloys of these materials in the range of high temperatures (T>200° C.) have corresponding ultrasound transmission properties which are sufficient for the ultrasonic Doppler method.

An important requirement is for the end face of the ultrasonic waveguide to be sufficiently wetted in order to ensure good acoustic coupling to the melt. If the ultrasonic waveguide is not wetted by the melt, it has been found that only an insignificantly small part of the ultrasonic energy can be injected into the fluid and no usable measurement signal is produced as a result.

The invention provides different mechanical and chemical processing methods for the end face of the ultrasonic waveguide in order to achieve wetting between the ultrasonic waveguide material and the melt. The number and sequence of the individual processing steps respectively depend on the type of melt in question, the material of the ultrasonic waveguide and the temperature range in which the measurements are intended to be carried out.

An important prerequisite for wetting is the distance of contamination, deposits and oxide layers on the end face of the cover plate 4 of the low-dispersion ultrasonic waveguide 2. This may be effected mechanically, for example by grinding and polishing, and/or chemically by means of a temporally limited effect of suitable chemicals, for example inorganic acids or suitable fluxes.

In the period of time between this preparation and the start of measurement, the cover plate 4 of the low-dispersion ultrasonic waveguide 2 must be protected from re-oxidation and/or contamination in a suitable manner. This may be achieved by means of a suitable protective layer, for example made of a metal, which has been mechanically and/or thermally applied to the end face of the cover plate 4. This protective layer must dissolve in the melt within a predefined period of time during measurement, with the result that direct contact between the melt and the prepared end face of the cover plate 4 is then achieved.

In some material pairings, the ultrasonic waveguide material itself is, in principle, not wetted or is wetted only above a particular temperature with an ideally cleaned surface. For these applications, it is necessary for the end of the cover plate 4 to be covered with a layer of a material which is easily wetted by the melt in the temperature range provided for measurement. There must be a homogeneous material connection between this layer and the low-dispersion ultrasonic waveguide. The additional cover layer may be implemented by fitting a disk or film to the cover plate 4 or by means of electrochemical deposition methods.

Another possibility is to modify the structure of the low-dispersion ultrasonic waveguide near the surface by means of ion implantation or similar physical methods.

Another prerequisite for using a sensor with a low-dispersion ultrasonic waveguide for the ultrasonic Doppler method is the dispersion-free transmission of the ultrasonic wave in a low-dispersion ultrasonic waveguide. In order to achieve this, the ultrasonic waveguide is constructed from a thin structure. This generally entails only incomplete filling of the cross section with material. If, when the low-dispersion ultrasonic waveguide 2 is being immersed in the melt, the latter advances along the cavities into the internal structure of the ultrasonic waveguide, interference-free, low-attenuation transmission is no longer ensured.

In order to prevent this, that end face of the low-dispersion ultrasonic waveguide 2 which faces the melt is closed with the cover plate 4 (already mentioned) and may additionally be designed with a cover plate.

The piezoelectric transducer and the electronic components connected downstream for the purpose of signal matching may generally be permanently exposed to temperatures up to a maximum of 100° C. Therefore, depending on the specific application, it may be necessary to additionally cool these temperature-sensitive sensor components. For this purpose, it is expedient, for example, to accommodate the corresponding components in a protective housing 6 with a double-walled protective sheath 8, a coolant flowing through the cavity of the latter during use.

The signal quality when measuring rates using ultrasonic Doppler methods can be considerably improved by electrically matching the piezoelectric transducer to the evaluation device in a suitable manner. In the present invention, this matching is achieved using an appropriately dimensioned circuit of capacitors and/or coils. The impedance of the piezoelectric transducer 1 should generally be below the characteristic impedance of the cable used to transport signals, with the result that ultrasonic fields are transmitted with a significantly higher intensity in the case of impedance transformation with the aid of coils and capacitors.

The melts to be examined are often heated and fused using induction heaters or electrical heaters with thyristor controllers. This leads to the induction of electrical currents directly in the melt or else in a low-dispersion ultrasonic waveguide 2. The use of electromagnetic pumps or magnetic field systems to influence the flow is a further source of electrical interference signals which may give rise to harmonics and thus impair the measurement result.

The present invention uses a special, electrical structure made of transformers, current-compensated inductors and twisted signal lines for the purpose of effectively reducing this electrical interference.

Ultrasonic Sensor for Measuring Flow Rates in Liquid Melts

LIST OF REFERENCE SYMBOLS

1 Piezoelectric transducer
2 Low-dispersion ultrasonic waveguide
3 Protective sheath
4 Cover plate
5 Electrical circuit of the control part and possibly internal evaluation part
6 Protective housing
7 Connection socket
8 Intermediate space/hollow-walled design of the protective sheath

The invention claimed is:

1. An ultrasonic sensor for measuring local flow rates in liquid melts, said sensor consisting of a low-dispersion ultrasonic waveguide, in which the material thickness of the structure carrying the ultrasonic waves is less than the minimum wavelength of the ultrasonic signal to be transmitted, transversely with respect to the transmission direction, a piezoelectric transducer and an electrical signal matching circuit, the low-dispersion ultrasonic waveguide which is connected to the piezoelectric transducer being composed of a material which has low acoustic attenuation with an acoustic attenuation coefficient of $\alpha<10$ dB/m in a temperature range above 200° C., which is relevant to the application, and is chemically resistant to the melt, and that end face of the low-dispersion ultrasonic waveguide which faces the melt being closed and being able to be wetted by the melt.

2. The ultrasonic sensor as claimed in claim 1, characterized in that the low-dispersion ultrasonic waveguide is composed of the metals iridium, molybdenum, niobium, tantalum, tungsten, zirconium, stainless steel, titanium, Monel or an alloy or combination of said metals.

3. The ultrasonic sensor as claimed in claim 2, characterized in that the low-dispersion ultrasonic waveguide consists of a multiplicity of films which are layered on top of one another in a two-dimensional manner, the propagation direction of the ultrasound being perpendicular to the surface normal.

4. The ultrasonic sensor as claimed in claim 3, characterized in that the low-dispersion ultrasonic waveguide consists of metal films which are layered on top of one another.

5. The ultrasonic sensor as claimed in claim 3, characterized in that the low-dispersion ultrasonic waveguide is composed of a material combination of metals and ceramic and/or a glass material.

6. The ultrasonic sensor as claimed in claim 1, characterized in that the length of the low-dispersion ultrasonic waveguide is between 100 mm and 1000 mm.

7. The ultrasonic sensor as claimed in claim 1, characterized in that the protective sheath is chemically resistant to the melt.

8. The ultrasonic sensor as claimed in claim 1, characterized in that the protective sheath is provided with thermal insulation.

9. The ultrasonic sensor as claimed in claim 8, characterized in that an intermediate space through which a coolant can flow is provided between the low-dispersion ultrasonic waveguide and the protective sheath.

10. The ultrasonic sensor as claimed in claim 8, characterized in that the protective sheath is of double-walled design and a coolant can flow through said protective sheath.

11. The ultrasonic sensor as claimed in claim 1, characterized in that that part of the ultrasonic sensor which faces away from the melt and has the piezoelectric transducer and electrical components is surrounded by a protective housing.

12. The ultrasonic sensor as claimed in claim 11, characterized in that the protective housing is of double-walled design, and a coolant can flow through the intermediate space.

13. The ultrasonic sensor as claimed in claim 1, characterized in that that end face of the low-dispersion ultrasonic waveguide which faces the melt is mechanically and/or chemically freed of dirt and oxides.

14. The ultrasonic sensor as claimed in claim 1, characterized in that the end face of the low-dispersion ultrasonic waveguide is provided with a smooth protective layer.

15. The ultrasonic sensor as claimed in claim 1, characterized in that an additional smooth cover plate or film is fitted to the end of the low-dispersion ultrasonic waveguide.

16. The ultrasonic sensor as claimed in claim 1, characterized in that the low-dispersion ultrasonic waveguide and the cover plate or the film are composed of different materials.

17. The ultrasonic sensor as claimed in claim 1, characterized in that the cover plate is provided with a thin smooth material layer which is applied by means of ion implantation or electrochemical or physical methods.

18. The ultrasonic sensor as claimed in claim 1, characterized in that the low-dispersion ultrasonic waveguide and the piezoelectric transducer are arranged immediately behind one another and are connected to one another by means of adhesive bonding, soldering or pressing.

19. The ultrasonic sensor as claimed in claim 1, characterized in that the piezoelectric transducer is connected to an evaluation device outside the ultrasonic sensor by means of capacitors and/or coils.

20. The ultrasonic sensor as claimed in claim 1, characterized in that symmetrically twisted conductors are provided for electrical signal transmission between the piezoelectric transducer and the evaluation device.

21. The ultrasonic sensor as claimed in claim 1, characterized in that DC isolation is fitted between the piezoelectric transducer and the evaluation device.

22. The ultrasonic sensor as claimed in claim 1, characterized in that a current-compensated inductor is fitted between the liquid metal and the evaluation device in order to reduce the leakage current.

* * * * *